(12) United States Patent
Chien et al.

(10) Patent No.: US 8,433,859 B2
(45) Date of Patent: Apr. 30, 2013

(54) APPARATUS AND METHOD FOR BUFFER MANAGEMENT FOR A MEMORY OPERATING

(75) Inventors: Kuo-Lung Chien, Taipei (TW); Ching-Wen Hsueh, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 369 days.

(21) Appl. No.: 12/277,450

(22) Filed: Nov. 25, 2008

(65) Prior Publication Data

US 2010/0131722 A1 May 27, 2010

(51) Int. Cl.
*G06F 12/00* (2006.01)

(52) U.S. Cl.
USPC .......................................... 711/154; 711/167

(58) Field of Classification Search ................... 711/154
See application file for complete search history.

(56) References Cited

U.S. PATENT DOCUMENTS

| | | | |
|---|---|---|---|
| 6,119,196 A * | 9/2000 | Muller et al. ................. | 710/243 |
| 6,138,188 A | 10/2000 | Hou | |
| 6,347,348 B1 | 2/2002 | Webber | |
| 6,757,795 B2 * | 6/2004 | Barri et al. .................... | 711/158 |
| 7,139,280 B2 | 11/2006 | Mansour et al. | |
| 7,188,219 B2 | 3/2007 | Jeddeloh | |
| 7,343,457 B1 * | 3/2008 | End, III ....................... | 711/150 |
| 7,698,498 B2 * | 4/2010 | Lakshmanamurthy et al. ............................. | 711/105 |
| 2002/0141256 A1 | 10/2002 | Barri et al. | |
| 2004/0073703 A1 * | 4/2004 | Boucher et al. ............... | 709/245 |
| 2004/0123036 A1 * | 6/2004 | Hammitt et al. .............. | 711/131 |
| 2006/0236010 A1 * | 10/2006 | O'Connor et al. ............ | 710/111 |
| 2007/0038829 A1 | 2/2007 | Tousek | |
| 2008/0072006 A1 * | 3/2008 | Seo et al. ...................... | 711/167 |
| 2008/0270744 A1 * | 10/2008 | Hashimoto .................... | 711/217 |
| 2009/0019193 A1 * | 1/2009 | Luk ................................ | 710/52 |

FOREIGN PATENT DOCUMENTS

| | | |
|---|---|---|
| CN | 1498374 | 5/2004 |
| TW | 444160 | 1/2001 |
| TW | 200602861 | 8/2006 |
| TW | 200707206 | 2/2007 |

OTHER PUBLICATIONS

English language translation of abstract of CN 1498374 (published May 19, 2004).

\* cited by examiner

*Primary Examiner* — Kaushikkumar Patel
(74) *Attorney, Agent, or Firm* — McClure, Qualey & Rodack, LLP

(57) ABSTRACT

The invention provides a buffer management apparatus coupled between a memory and a plurality of circuit blocks accessing the memory. In one embodiment, the buffer management apparatus comprises an arbiter, a plurality of buffers, and a multiplexer. The arbiter selects a plurality of owners for the buffers from the circuit blocks, passes a plurality of access request signals generated by the owners to the corresponding buffers, and delivers a plurality of access response signals retrieved from the corresponding buffers to the owners in reply to the access request signals. The multiplexer alternately retrieves the access request signals from the buffers to generate a memory access signal delivered to a memory controller of the memory, receives a memory response signal generated by the memory controller in reply to the memory access signal, and distributes the memory response signal to the buffers as the access response signals.

23 Claims, 6 Drawing Sheets

APPARATUS AND METHOD FOR BUFFER MANAGEMENT FOR A MEMORY OPERATING

BACKGROUND OF THE INVENTION

1. Field of the Invention

The invention relates to memories, and more particularly to buffer management for memories.

2. Description of the Related Art

Memories are common components of electronic systems. An electronic system with a memory may comprise multiple component devices requiring accessing of the memory. The memory, however, can only service an access request of one of the component devices at a time. Therefore, when multiple component devices of the electronic system require accessing of the memory at the same time, a buffer management apparatus is provided to handle the memory access requests of the multiple component devices.

Referring to FIG. 1, a block diagram of an electronic system 100 with a conventional buffer management apparatus 104 is shown. In additional to the buffer management apparatus 104, the electronic system 100 comprises a plurality of circuit blocks 102a~102n, a memory controller 106, and a memory 108. Each of the circuit blocks 102a~102n connects to a component device of the electronic system 100 and generates an access request signal sent to the arbiter 104 when the component device wants to access the memory 108. The access request signal (Req) comprises request mode information (Mode) indicating what type an access request is received, such as a read request, a write request, a byte read quest, a byte write quest, a mask read quest, or a mask write quest, and data (Odata) which is to be written to the memory 108.

The buffer management apparatus 104 comprises an arbiter 112, a mode latch circuit 114, and an address generator 116. When the arbiter 112 receives multiple access request signals from the circuit blocks 102a~102n at the same time, the arbiter 112 selects an owner from the multiple circuit blocks 102a~102n to send the access requests to the memory 108. After the owner is selected, the arbiter 112 sends a grant signal (Gnt) to the owner to notify the circuit block that its access request is granted. The mode latch circuit 114 then stores the request mode information (Mode) of the access request sent by the owner. The address generator 116 then generates address information (Addr) according to the owner selected by the arbiter 112 and the mode information stored in the mode latch circuit 114, wherein the address information indicates the memory address accessed by the owner.

After the owner is selected, the arbiter 112 generates owner information about the owner which sends the access request. In addition, the arbiter 112 also generates request type information (Req-type) according to the request mode information (Mode) generated by the owner, wherein the request type information also indicates what type of the access request is, such as a read request or a write request. Thus, a memory access request signal comprising the owner information (Owner), the request type information (Req-type), written data (Odata), and the address information (Addr) is formed and delivered to the memory controller 106.

The memory controller 106 then accesses the memory 108 according to the memory access signal and generates a memory response signal in response to the memory access signal. In one embodiment, the memory response signal comprises an address latch enable signal (Ale), a data latch enable signal (Dle) from memory controller 106, and data (Idata) read from the memory 108 according to the memory access signal. The address latch signal informs the owner that a current address has been accessed and requests for a new address. The data latch signal informs the owner that a current data has been output to the owner.

The arbiter 112 then forwards the address latch enable signal (Ale), the data latch enable signal (Dle), and the read-out data (Idata) as an access response signal to the owner selected from the multiple circuit blocks 102a~102n. The circuit block sends an address increment signal (Ptr-inc) to the address generator 116 to increment the address of the address information (Addr). When all addresses requested by an access request signal have been accessed, the arbiter 112 sends an address latch completion signal (Ale-last) to inform the owner. When all data requested by an access request signal have be read out from the memory 108, the arbiter 112 sends a data latch completion signal (Dle-last) to inform the owner. After all access requests of the current owner is completed, the arbiter 112 selects a next owner capable of accessing the memory 108 from the other circuit blocks 102a~102n, and the same memory access procedure is repeated for the next owner.

The buffer management apparatus 104 generates address information (Addr) with the mode latch circuit 114 and the address generator 116. If the circuit blocks accessing the memory can generate address information by themselves, the mode latch circuit 114 and the address generator 116 can be omitted from the buffer management apparatus 104. Referring to FIG. 2, a block diagram of an electronic system 200 with another conventional buffer management apparatus 204 is shown. A plurality of circuit blocks 202a~202n directly generates access requests comprising request type information (Req-type), written data (Odata), and accessed address (Addr). After the arbiter 212 selects an owner of the memory 208 from the circuit blocks 202a~202n, the arbiter directly forwards the request type information (Req-type), the written data (Odata), and the accessed address (Addr) generated by the owner as a memory access signal sent to the memory controller 206. The mode latch circuit 114 and the address generator 116 therefore do not exist in the buffer management apparatus 204 of FIG. 2.

With the advancement of electronic systems, bandwidth requirements of memories are being increased. However, in order to get higher bandwidth, some performances may be sacrificed to accommodate the timing critical path, such as chip area or power consumption. Thus, a buffer management apparatus interfacing between the memory and the component circuits is required to solve the problem.

BRIEF SUMMARY OF THE INVENTION

The invention provides a buffer management apparatus. In one embodiment, the buffer management apparatus is coupled between a memory and a plurality of circuit blocks accessing the memory, and the buffer management apparatus comprises an arbiter, a plurality of buffers, and a multiplexer. The arbiter selects a plurality of owners for the buffers from the circuit blocks, passes a plurality of access request signals generated by the owners to the corresponding buffers, and delivers a plurality of access response signals retrieved from the corresponding buffers to the owners in reply to the access request signals. The buffers buffer the access request signals generated by the owners, and buffer the access response signals sent to the owners. The multiplexer alternately retrieves the access request signals from the buffers to generate a memory access signal, sends the memory access signal to a memory controller of the memory, receives a memory response signal generated by the memory controller in reply to the memory access signal, and distributes the memory response signal to the buffers as the access response signals.

The invention provides a method for buffer management for a memory. In one embodiment, a plurality of circuit blocks require accessing the memory. First, a plurality of owners for a plurality of buffers are selected from the circuit blocks. A plurality of access request signals generated by the owners are then buffered by the buffers. The access request signals are then alternately retrieved from the buffers to generate a memory access signal delivered to a memory controller of the memory. After a memory response signal generated by the memory controller in reply to the memory access signal is received, the memory response signal is distributed to the buffers as a plurality of access response signals. The access response signals are then buffered by the buffers. Finally, the access response signals are retrieved from the buffers and delivered to the owners in reply to the access request signals.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
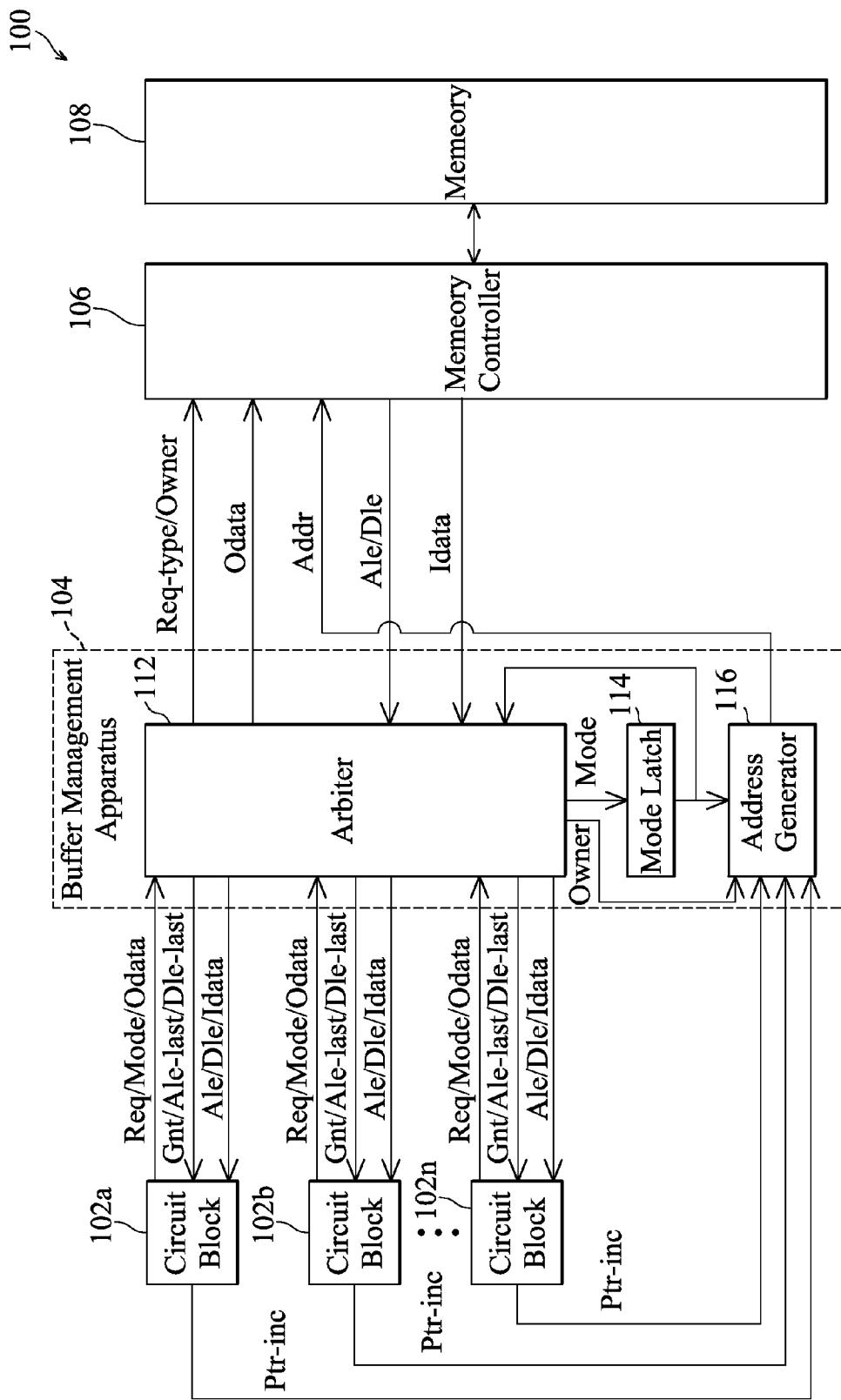
FIG. 1 is a block diagram of an electronic system 100 with a conventional buffer management apparatus.
Figure 2:
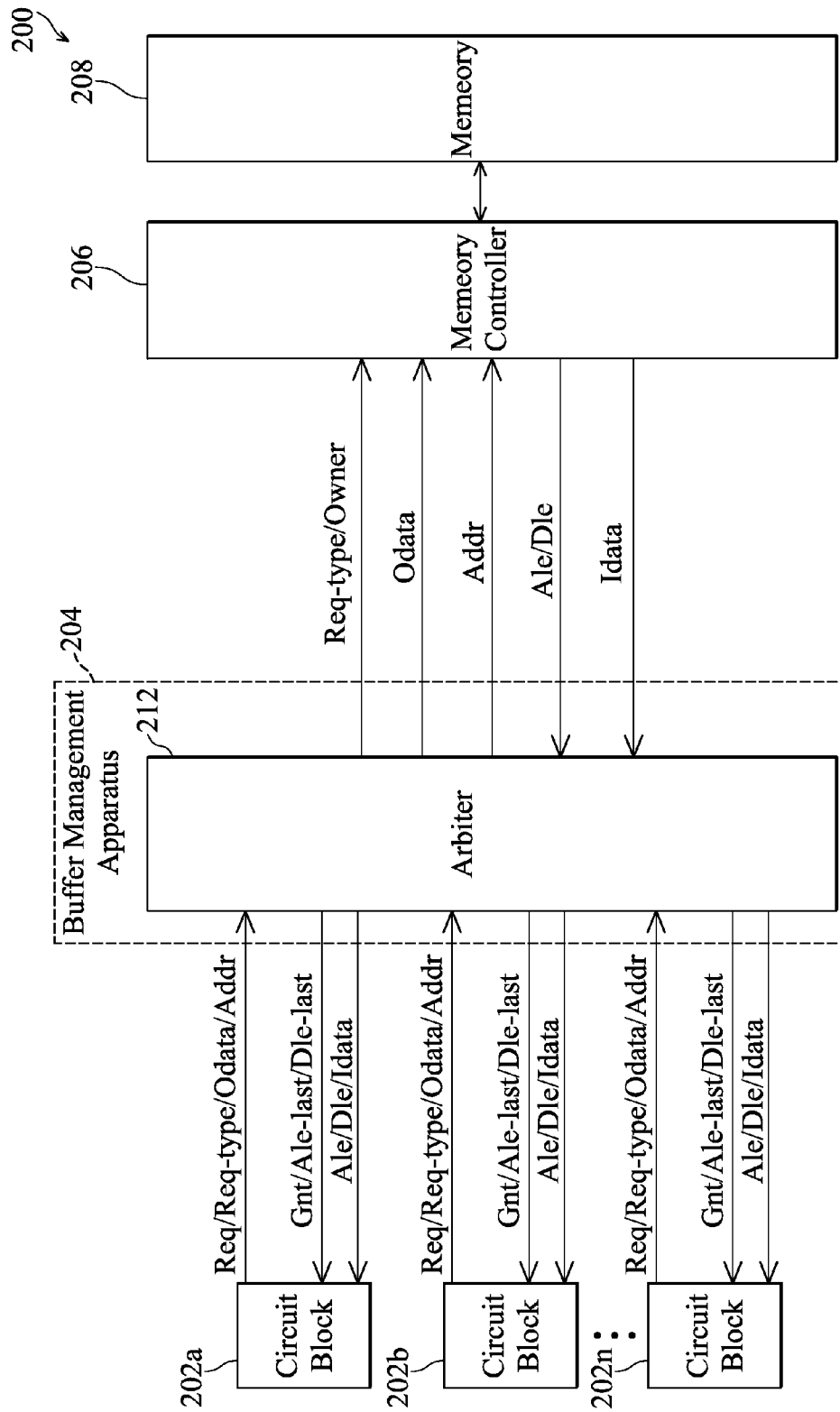
FIG. 2 is a block diagram of an electronic system with another conventional buffer management apparatus.
Figure 3A:
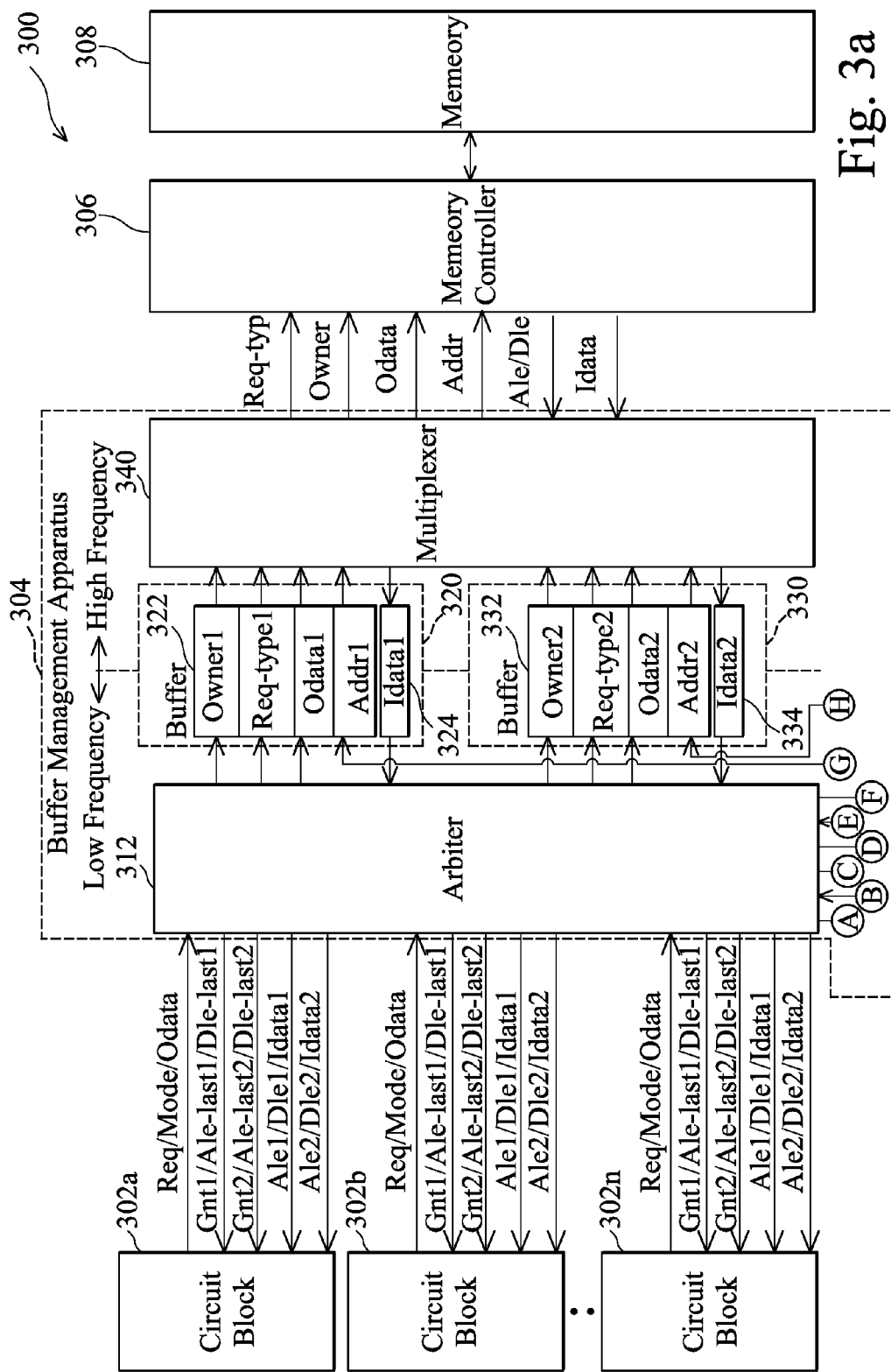
FIG. 3 is a block diagram of an electronic system with a buffer management apparatus according to the invention.
Figure 3B:
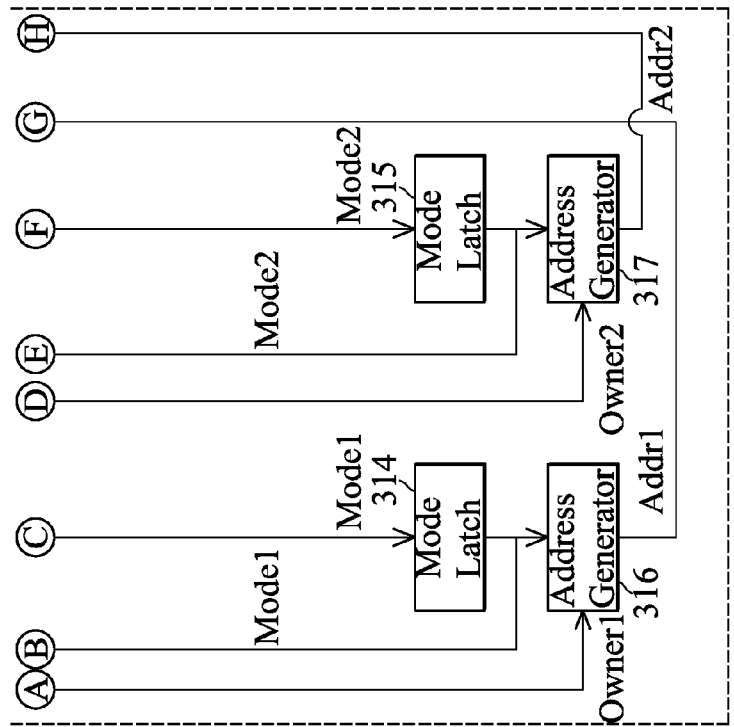

Referring to FIG. 3, a block diagram of an electronic system 300 with a buffer management apparatus 304 according to the invention is shown. In addition to the buffer management apparatus 304, the electronic system 300 further comprises a plurality of circuit blocks 302a~302n, a memory controller 306, and a memory 308. The memory 308 and the memory controller 306 operate with a frequency higher than a frequency operated by the circuit blocks 302a~302n. Generally speaking, the high frequency ranges from one to two times that of the low frequency. In one embodiment, the high frequency is double that of the low frequency. Thus, compared with the buffer management apparatus 104 of FIG. 1, the buffer management apparatus 304 has distinctive features of the interface between the memory 308 and the circuit blocks 302a~302n with different frequency operated thereof.

The buffer management apparatus 304 comprises an arbiter 312, two mode latch circuits 314 and 315, two address generators 316 and 317, two buffers 320 and 330, and a multiplexer 340. The arbiter 312 operates with the low frequency, and the multiplexer 340 operates with the high frequency. When the circuit blocks 302a~302n want to access the memory 308, the circuit blocks 302a~302n sends access requests (Req) to the arbiter 312. In one embodiment, an access request comprises request mode information (Mode), indicating whether the access request is a read request or a write request, and written data (Odata). Take two owners with two modes for example in the embodiment, when the arbiter 312 receives multiple access requests from the circuit blocks 302a~302n at the same time, the arbiter 312 selects two owners for the two buffers 320 and 330 from the multiple circuit blocks 302a~302n sending the access requests according to priority of the circuit blocks 302a~302n. Each of the owners is dedicated to one of the buffers 320 and 330. The two owners selected for the two buffers 320 and 330 can be of the same circuit block or different circuit blocks.

After the owners of the buffers 320 and 330 are selected, the arbiter 312 sends grant signals (Gnt) to the two owners to notify the circuit blocks that their access requests are granted. The mode latch circuit 314 and 315 then respectively store the request mode information (Mode) of the access requests sent by the two owners. The address generators 316 and 317 then respectively generate address information (Addr1 and Addr2) according to the mode information stored in the mode latch circuit 314 and 315, wherein the address information (Addr1 and Addr2) respectively indicates the memory addresses accessed by the two owners.

After each of the buffers 320 and 330 are selected, the arbiter 312 generates owner information (Owner1 and Owner2) respectively indicating the owners which sent the access requests. In addition, the arbiter 312 also generates request type information (Req-type1 and Req-type 2) according to the request mode information (Mode) generated by the two owners, wherein the request type information also indicates whether the access requests are read requests or write requests. Thus, a first access request signal, corresponding to a first owner of the buffer 322, comprising the owner information (Owner1), the request type information (Req-type1), the written data (Odata1), and the address information (Addr1) is formed and delivered to the buffer 320. Accordingly, a second access request signal, corresponding to a second owner of the buffer 330, comprising the owner information (Owner2), the request type information (Req-type2), the written data (Odata2), and the address information (Addr2) is formed and delivered to the buffer 330.

The buffer 320 and 330 respectively comprise first component buffers 322 and 332, and second component buffers 324 and 334. In one embodiment, the first component buffers 322 and 332, and the second component buffers 324 and 334 are first-in-first-out (FIFO) ring buffers. The first component buffers 322 and 332 respectively buffer the first access request signal of the first owner and the second access request signal of the second owner. For example, the first component buffer 322 stores the owner information (Owner1), the request mode information (Req-type1), the written data (Odata1), and the accessed address (Addr1) carried by the first access request signal of the first owner. Accordingly, the second component buffer 332 stores the owner information (Owner2), the request mode information (Req-type2), the written data (Odata2), and the accessed address (Addr2) carried by the second access request signal of the second owner.

The multiplexer 340 then retrieves the first access request signal and the second access request signal respectively from the component buffers 322 and 332. The multiplexer 340 then alternately selects the first access request signal and the second access request signal as a memory access signal and delivers the memory access signal to the memory controller 306 with the high frequency. For example, the first access request signal comprising the owner information (Owner1), the request type information (Req-type1), the written data (Odata1), and the accessed address (Addr1) stored in the component buffer 322 are first delivered to the memory controller 340 as the memory access signal. After the memory controller 340 completely receives the memory access signal about the first access request signal, the second access request signal (Owner2, Req-type2, Odata2, or Addr2) is delivered to the memory controller 340 as the memory access signal.

Data of the first access request signal and the second access request signal are delivered to the first component buffers 322 and 332 with the low frequency. When the multiplexer 340 operates with the higher frequency than ordinary structure, the operating bandwidth of the electronic system 300 will increase approximately linearly.

The memory controller 306 then accesses the memory 308 according to the memory access signal, and generates a memory response signal with the high frequency in response to the memory access signal. In one embodiment, the memory response signal comprises read out data (Idata) derived from the memory 308, address latch enable (Ale) information, and data latch enable (Dle) information derived from the memory controller 306. After the multiplexer 340 receives the memory response signal from the memory controller 306, the multiplexer 340 alternately distributes the memory response signal to the buffers 320 and 330 with the high frequency as a first access response signal and a second access response signal. The first access response signal is stored in the second component buffer 324 of the buffer 320, and the second access response signal is stored in the second component buffer 334 of the buffer 330. In one embodiment, the first access response signal and the second access response signal comprise read out data (Idata1 and Idata2) retrieved from the memory 308 by the memory controller 306 according to the memory access request signal.

The arbiter 312 then retrieves the access response signals from the second component buffers 324 and 334 and delivers the access response signals to the owners with the low frequency. Because one circuit block may be the owner of the buffer 320 or the buffer 330, the circuit blocks 302a~302n may receive read out data (Idata1) retrieved from buffer 320 or receive read out data (Idata2) retrieved from buffer 330. If a circuit block is the owner of both of the buffers 320 and 330, the circuit block simultaneously receives both read out data (Idata1 and Idata2).

In addition, when a current address has been accessed, the arbiter 312 generates an address latch signal (Ale1/Ale2) to request the owner for a new address. When a current data has been output to the owner, the arbiter 312 generates a data latch signal (Dle1/Dle2) to inform the owner. When all addresses requested by an access request signal have been accessed, the arbiter 312 sends an address latch completion signal (Ale-last1/Ale-last2) to inform the owner. When all data requested by an access request signal have be read out from the buffer 324 or 334, the arbiter 312 sends a data latch completion signal (Dle-last1/Dle-last2) to inform the owner.

Figure 4:
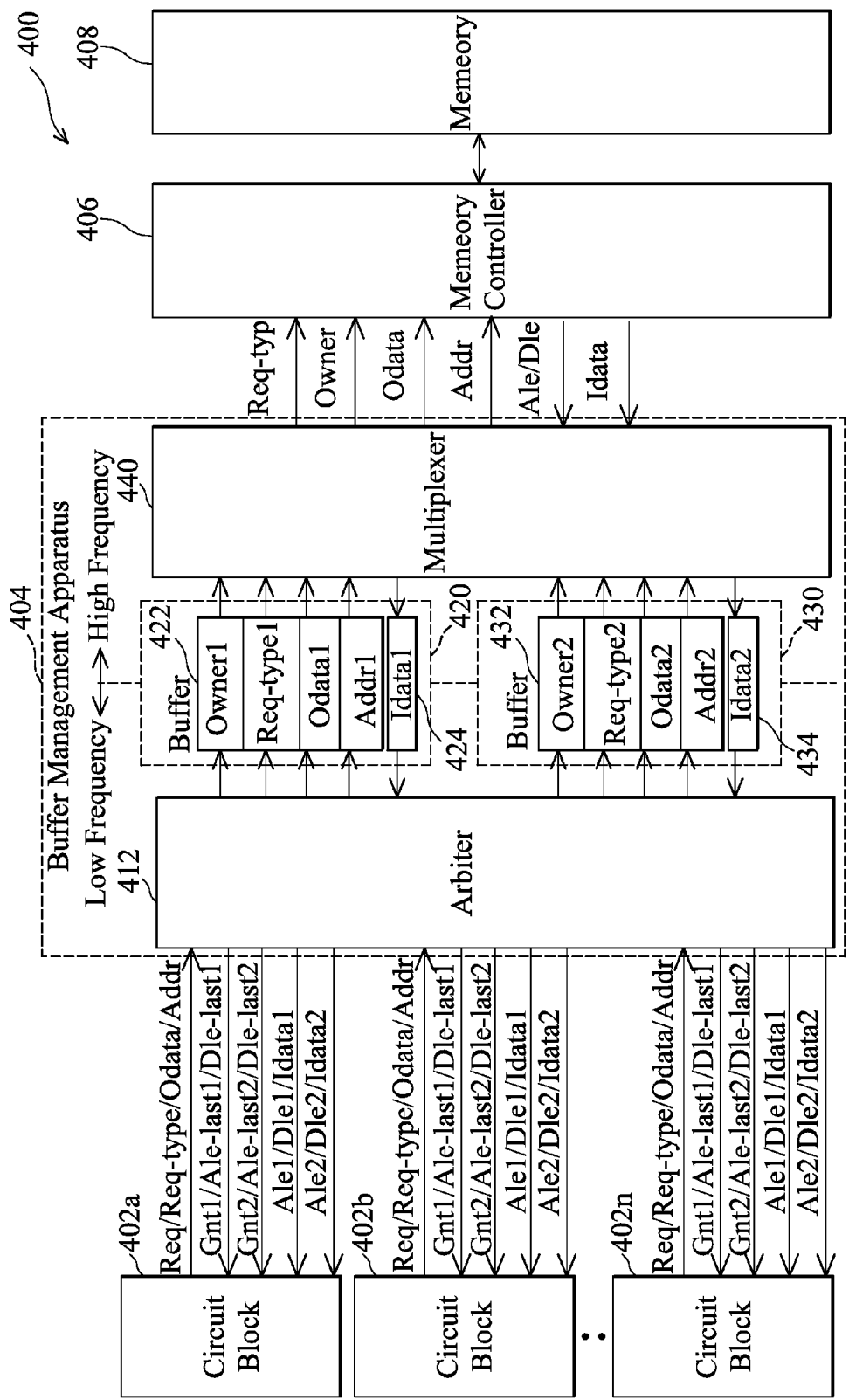
FIG. 4 is a block diagram of an electronic system with another embodiment of a buffer management apparatus according to the invention.

If the circuit blocks 302a~302n accessing the memory can generate address information by themselves, the mode latch circuits 314 and 315 and the address generators 316 and 317 can be removed from the buffer management apparatus 304. Referring to FIG. 4, a block diagram of an electronic system 400 with another buffer management apparatus 404 according to the invention is shown. A plurality of circuit blocks 402a~402n directly generates access requests (Req) comprising request type information (Req-type), written data (Odata), and accessed address (Addr). After the arbiter 412 selects owners of the buffers 420 and 430 from the circuit blocks 402a~402n, the arbiter directly forwards the request type information (Req-type), the written data (Odata), and the accessed address (Addr) generated by the owners to the buffers 420 and 430. The mode latch circuits 314 and 315, and the address generators 316 and 317 therefore do not exist in buffer management apparatus 404 of FIG. 4.

The high frequencies of the memory 308 and 408 are restricted to the range of one to two times that of low frequencies. When high frequencies of a memory is higher than double that of the low frequencies of the circuit blocks accessing the memory, the structure of the buffer management apparatus 304 and 404 of FIGS. 3 and 4 can be extended to form a new buffer management apparatus interfacing the circuit blocks with the memory. For example, if the memory operates with a high frequency which is N times that of the low frequency of the circuit blocks, the new buffer management apparatus comprises M buffers, wherein the number M of the buffers is the smallest integer greater than or equal to the quotient N. In one embodiment, the new buffer management apparatus also comprises M mode latch circuits and M address generators.

Figure 5:
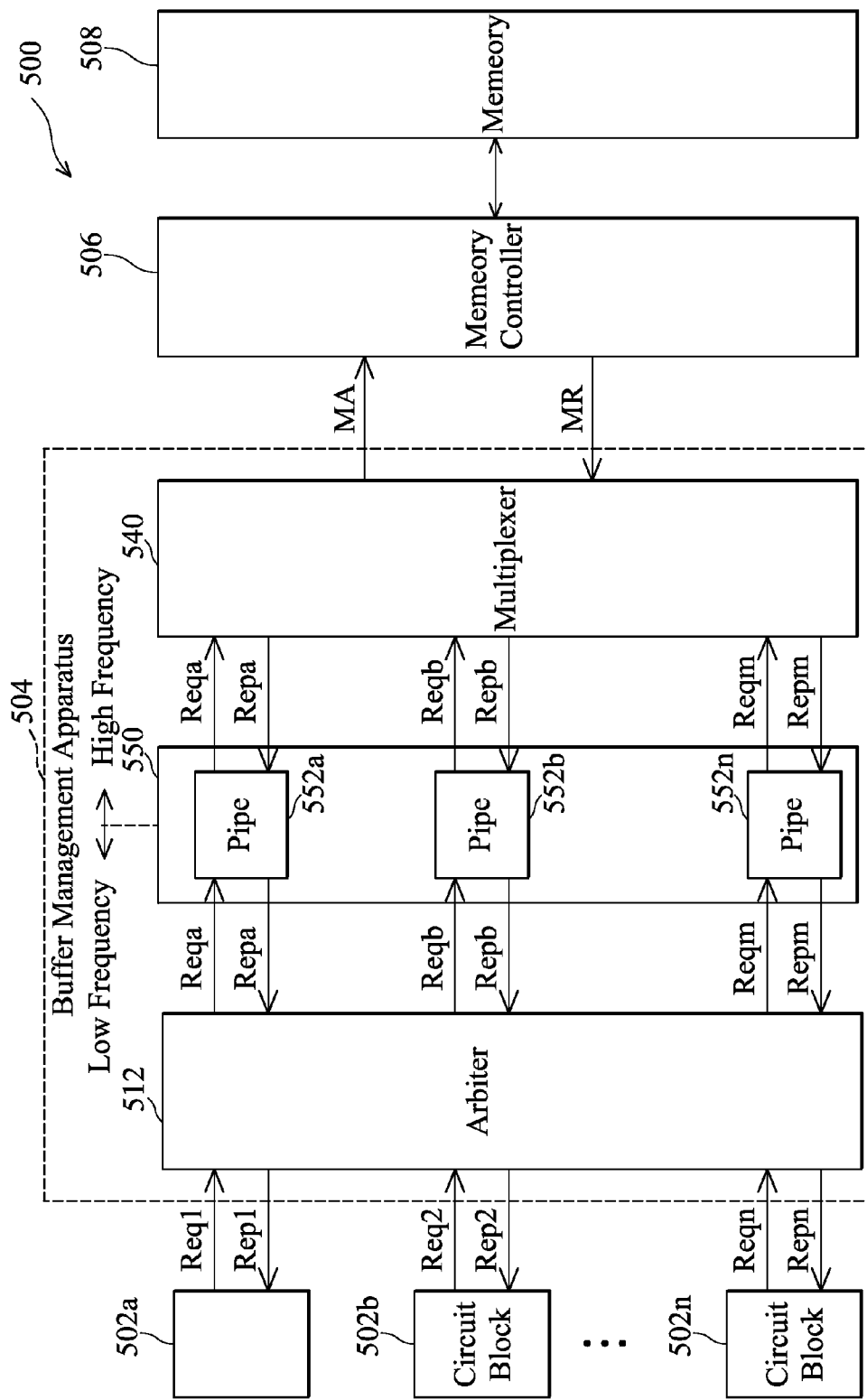
FIG. 5 is a block diagram of an electronic system with another embodiment of a buffer management apparatus according to the invention.

Referring to FIG. 5, a block diagram of an electronic system 500 with another embodiment of a buffer management apparatus 504 according to the invention is shown. In one embodiment, the buffer management apparatus 504 comprises an arbiter 512, a buffer 550 comprising several pipes 552a~552m, and a multiplexer 540. The buffer management apparatus 504 is approximately similar to the buffer management apparatus 404 of FIG. 4 except for the buffer 550. A plurality of circuit blocks 502a~502n request to access the memory 508 and send access request signals $Req_1$~$Req_n$ to the arbiter 512 of the buffer management apparatus 504. In one embodiment, the access request signals $Req_1$~$Req_n$ are identical to those shown in FIGS. 3 and 4. The arbiter 512 then selects several owners for the pipes 552a~552m of the buffer 550 from the circuit blocks 502a~502n, and passes access request signals $Req_a$~$Req_m$ generated by the owners to the corresponding pipes 552a~552m.

The pipes 552a~552n operate similarly as the buffers 422 and 432 shown in FIG. 4 and buffer the access request signals $Req_a$~$Req_m$ generated by the corresponding owners. The multiplexer 540 then alternately retrieves the access request signals $Req_a$~$Req_m$ from the pipes 552a~552n of the buffer 550 to generate a memory access signal MA, and sends the memory access signal MA to a memory controller 506 of the memory 508. The memory controller 506 then retrieves data from the memory 508 according to the memory access signal MA to generate a memory response signal MR. After the memory response signal generated by the memory controller 506 is received by the multiplexer 540, the multiplexer 540 distributes the memory response signal MR to the pipes 552a~552m as the access response signals $Rep_a$~$Rep_m$.

The pipes 552a~552m of the buffer 550 then buffer the access response signals $Rep_a$~$Rep_m$. In one embodiment, the access response signals $Rep_a$~$Rep_m$ are identical to the memory response signals comprising read out data (Idata), address latch enable (Ale) information, and data latch enable (Dle) information of FIGS. 3 and 4. The arbiter 512 then retrieves the access response signals $Rep_a$~$Rep_m$ from the pipes 552a~552m and delivers the access response signals $Rep_a$~$Rep_m$ to the owners 502a~502n as the access response signals $Rep_1$~$Rep_n$ in reply to the access request signals $Req_1$~$Req_n$. In one embodiment, the memory 508 and the memory controller 506 operate with a high frequency, the circuit blocks 502a~502n operate with a low frequency. The multiplexer 540 sends the memory access signal MA to the memory controller 506 and receives the memory response signal MR from the memory controller 506 with the high frequency, and the arbiter 512 receives the access request signals Req$_1$~Req$_n$ from the circuit blocks 502a~502n and delivers the access response signals Rep$_1$~Rep$_n$ to the circuit blocks 502a~502n with the low frequency.

The invention provides a buffer management apparatus interfacing a plurality of circuit blocks to a memory, wherein the circuit blocks accessing the memory operates with a low frequency and the memory operates with a high frequency. By the implementation of these embodiments, the buffers can be efficiently used, thereby amount of the buffers, area and power consumption of chip can be reduced. In addition, data bandwidth of the memory is increased due to the high operating frequency to improve system performance.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A buffer management apparatus, coupled between a memory and circuit blocks accessing the memory, wherein the buffer management apparatus comprising:
    an arbiter, operating with a low frequency, selecting the circuit blocks, passing access request signals generated by the selected circuit blocks to buffers respectively, and delivering access response signals retrieved from the corresponding buffers to the selected circuit blocks in reply to the access request signals;
    wherein the buffers are arranged to buffer the access request signals generated by the selected circuit blocks, and-to buffer the access response signals sent to the selected circuit blocks; and
    a multiplexer, operating with a high frequency which is higher than that of the arbiter, alternately retrieving the access request signals from the buffers to generate a memory access signal, sending the memory access signal to a memory controller of the memory, receiving a memory response signal generated by the memory controller in reply to the memory access signal, and distributing the memory response signal to the buffers as the access response signals.

2. The buffer management apparatus as claimed in claim 1, wherein the memory and the memory controller operate with a high frequency, the circuit blocks operate with a low frequency, the multiplexer sends the memory access signal to the memory controller and receives the memory response signal from the memory controller with the high frequency, and the arbiter receives the access request signals from the selected circuit blocks and delivers the access response signals to the selected circuit blocks with the low frequency.

3. The buffer management apparatus as claimed in claim 1, wherein the buffers are first-in-first-out (FIFO) ring buffers.

4. The buffer management apparatus as claimed in claim 2, wherein the number of the buffers is the smallest integer greater than or equal to a quotient obtained by dividing the high frequency by the low frequency.

5. The buffer management apparatus as claimed in claim 1, wherein each of the buffers comprises:
    a first component buffer, dedicated to buffering the access request signal generated by the selected circuit block assigned to the buffer by the arbiter; and
    a second component buffer, dedicated to buffering the access response signal sent to the selected circuit block assigned to the buffer by the arbiter.

6. The buffer management apparatus as claimed in claim 1, wherein each of the access request signals comprises information indicating type of the access request.

7. The buffer management apparatus as claimed in claim 1, wherein the access response signals comprise read out data retrieved from the memory by the memory controller according to the access request signals.

8. The buffer management apparatus as claimed in claim 6, wherein the buffer management apparatus further comprises:
    mode latch circuits, each dedicated to one of the buffers, storing the request mode information generated by the selected circuit block of the corresponding buffer; and
    address generators, coupled between the mode latch circuits and the buffers, each dedicated to one of the buffers, generating the address information according to the request mode information and the information as a portion of the access request signal delivered to the corresponding buffer;
    wherein the number of the mode latch circuits and the number of the address generators are equal to the number of the buffers.

9. The buffer management apparatus as claimed in claim 1, wherein the arbiter selects the selected circuit blocks corresponding to the buffers from the circuit blocks according to priorities of the circuit blocks.

10. A method for buffer management for a memory, wherein circuit blocks require accessing the memory, and the method comprising:
    selecting the circuit blocks;
    buffering access request signals generated by the selected circuit blocks with the buffers;
    alternately retrieving the access request signals from the buffers by a multiplexer operating with a high frequency to generate a memory access signal delivered to a memory controller of the memory;
    after receiving a memory response signal generated by the memory controller in reply to the memory access signal, distributing the memory response signal to the buffers as access response signals;
    buffering the access response signals with the buffers; and
    retrieving the access response signals from the buffers and delivering the access response signals to the selected circuit blocks by an arbiter operating with the low frequency in reply to the access request signals.

11. The method as claimed in claim 10, wherein the memory and the memory controller operate with a high frequency, the circuit blocks operate with a low frequency, the access request signals and the access reply signals are generated with the low frequency, and the memory access signal and the memory response signal are generated with the high frequency.

12. The method as claimed in claim 10, wherein the buffers are first-in-first-out (FIFO) ring buffers.

13. The method as claimed in claim 10, wherein the number of the buffers is the smallest integer greater than or equal to a quotient obtained by dividing the high frequency by the low frequency.

14. The method as claimed in claim 10, wherein each of the buffers comprises:
    a first component buffer, dedicated to buffering the access request signal generated by the selected circuit block assigned to the buffer by the arbiter; and
    a second component buffer, dedicated to buffering the access response signal sent to the selected circuit block assigned to the buffer by the arbiter.

15. The method as claimed in claim 10, wherein each of the access request signals comprises information indicating about the access request signal, request mode information indicating whether an access request is a read request or a write request, written data, and address information indicating accessed address of the memory.

16. The method as claimed in claim 10, wherein the access response signals comprise read out data retrieved from the memory by the memory controller according to the access request signals.

17. The method as claimed in claim 10, wherein the selected circuit blocks corresponding to the buffers are selected according to priorities of the circuit blocks.

18. A buffer management apparatus, coupled between a memory and circuit blocks accessing the memory, wherein the buffer management apparatus comprising:
   an arbiter, operating with a low frequency, selecting the circuit blocks, passing access request signals generated by the selected circuit blocks to the corresponding pipes, and delivering access response signals retrieved from the corresponding pipes to the selected circuit blocks in reply to the access request signals;
   the buffer, comprising the plurality of pipes, wherein each pipe buffers the access request signal generated by the corresponding selected circuit block and the access response signal sent to the corresponding selected circuit block; and
   a multiplexer, operating with a high frequency which is higher than that of the arbiter, alternately retrieving the access request signals from the pipes of the buffer to generate a memory access signal, sending the memory access signal to a memory controller of the memory, receiving a memory response signal generated by the memory controller in reply to the memory access signal, and distributing the memory response signal to the pipes as the access response signals.

19. The buffer management apparatus as claimed in claim 18, wherein the memory and the memory controller operate with a high frequency, the circuit blocks operate with a low frequency, the multiplexer sends the memory access signal to the memory controller and receives the memory response signal from the memory controller with the high frequency, and the arbiter receives the access request signals from the selected circuit blocks and delivers the access response signals to the selected circuit blocks with the low frequency.

20. The buffer management apparatus as claimed in claim 18, wherein each of the pipes comprises:
   a first component pipe, dedicated to buffering the access request signal generated by the corresponding selected circuit block assigned by the arbiter; and
   a second component pipe, dedicated to buffering the access response signal sent to the selected circuit block assigned by the arbiter.

21. The buffer management apparatus as claimed in claim 18, wherein each of the access request signals comprises owner information indicating the selected circuit block that sent the access request signal, request mode information indicating whether an access request is a read request or a write request, written data, and address information indicating accessed address of the memory.

22. The buffer management apparatus as claimed in claim 18, wherein the access response signals comprise read out data retrieved from the memory by the memory controller according to the access request signals.

23. The buffer management apparatus as claimed in claim 18, wherein the arbiter selects the selected circuit blocks corresponding to the pipes from the circuit blocks according to priorities of the circuit blocks.

* * * * *